United States Patent
Ault

(10) Patent No.: US 6,483,824 B1
(45) Date of Patent: Nov. 19, 2002

(54) METHOD AND APPARATUS FOR ACQUIRING SERVICE IN A "BORDER AREA"

(75) Inventor: Jan C. Ault, Santee, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/364,555

(22) Filed: Jul. 29, 1999

(51) Int. Cl.[7] .................... H04Q 7/00; H04Q 7/20; H04B 1/38; H04M 1/00
(52) U.S. Cl. .................. 370/332; 455/434; 455/551; 455/437
(58) Field of Search .................. 370/328, 331, 370/332, 335–337, 342–345, 347, 441–442; 455/422, 436–437, 439, 443, 458, 434, 550, 552–553, 551

(56) References Cited

U.S. PATENT DOCUMENTS

| | | | |
|---|---|---|---|
| 4,916,728 A | 4/1990 | Blair | 379/59 |
| 5,255,307 A | * 10/1993 | Mizikovsky | 455/432 |
| 5,276,905 A | 1/1994 | Hurst et al. | 455/33.1 |
| 5,428,666 A | 6/1995 | Fyfe et al. | 379/58 |
| 5,442,806 A | 8/1995 | Barber et al. | 455/33.1 |
| 5,586,338 A | 12/1996 | Lynch et al. | 455/34.1 |
| 5,732,348 A | * 3/1998 | Norimatsu | 455/434 |
| 5,754,542 A | 5/1998 | Ault et al. | 370/342 |
| 5,761,618 A | * 6/1998 | Lynch et al. | 455/419 |
| 5,784,693 A | 7/1998 | Barber et al. | 455/434 |
| 5,987,324 A | * 11/1999 | Peranto et al. | 455/432 |
| 5,999,811 A | * 12/1999 | Mölne | 455/432 |

FOREIGN PATENT DOCUMENTS

EP    0 352 0786 A2    1/1990

OTHER PUBLICATIONS

"Mobile Station–Base Station Compatibility Standard for Dual–Mode Wideband Spread Spectrum Cellular System." TIA/EIA/IS–95–A, pp. 02–29 through 02–40 (May 1995).

* cited by examiner

Primary Examiner—Kwang Bin Yao
Assistant Examiner—Kevin C. Harper
(74) Attorney, Agent, or Firm—Philip Wadsworth; Charles Brown; Bruce W. Greenhaus

(57) ABSTRACT

A method and computer program product for acquiring service in a border area that is serviced by two communications systems that share the same frequencies. The method of the present invention includes the steps of scanning a predetermined range of control channels in order to determine the first and second strongest control channels. A determination is then made as to whether a first system identification code (SID) associated with a signal received over the strongest control channel is acceptable. This can be accomplished, for example, by comparing the first SID to a list of acceptable SIDs. Conventionally, if the SID associated with a signal received over the strongest control channel is not acceptable, the system acquisition process will be aborted. However, in the present invention, the probability of acquiring service is increased because a determination is made whether a SID associated with the signal received over the second strongest control channel is acceptable, if the first SID was found not to be acceptable. Similarly, the second strongest paging channel can be used to increase the probability of acquiring service.

2 Claims, 6 Drawing Sheets

METHOD AND APPARATUS FOR ACQUIRING SERVICE IN A "BORDER AREA"

BACKGROUND OF THE INVENTION

1. Field of the Invention

The present invention relates generally to wireless communication systems, and more specifically, to a method and apparatus for improving the probability of acquiring service in a "border area" between two service areas.

2. Related Art

A cellular communications system typically provides services to a geographic service area that includes many smaller geographic areas, known as cells. Each cell is serviced by a transmitter-receiver station, also known as a cell site or base station. The cell sites are connected through land lines, or other communication links, such as microwave links, to a mobile telephone switching office (MTSO). The MTSO is connected to the public switched telephone network.

Under current FCC rules, any given geographic service area may be serviced by up to two competing providers of cellular airtime communications services (also referred to as service providers, system providers, cellular carriers or simply "carriers"). Each of the two carriers in any given geographic location, which are commonly referred to as "A" and "B" carriers, is associated with a system identification code (SID) that uniquely identifies the carrier. For example, carrier A may be Bell Atlantic and may have a SID=46, and carrier B may be Cellular One and have a SID=25. The two service providers in any given geographic service area are assigned different groups (or sets) of frequencies through which services are provided. That is, the A carrier is assigned a first set of frequencies and the B carrier is assigned a second set of frequencies that do not overlap the A set of frequencies.

Each given geographic service area typically has one or more neighboring geographic service areas. Each neighboring geographic service area is also serviced by two carriers, which shall be referred to as "A'" and "B'" carriers. The A carrier and the A' each have a different SID. Similarly the B carrier and the B' carrier each have a different SID. However, the A carrier and the A' carrier both provide service using the same set of frequencies. Similarly, the B carrier and the B' carrier both provide service using the same set of frequencies. The area where two geographic service areas meet (for example, where a cell of carrier A overlaps a cell of carrier A') is often referred to as a "border area". As will be described below, a user terminal may experience problems acquiring service within such border areas. Accordingly, an object of the present invention is to improve system acquisition in these "border areas."

SUMMARY OF THE INVENTION

The present invention is directed toward a method and apparatus for acquiring service in a border area that is serviced by two communications systems that share the same frequencies. The method of the present invention includes the steps of scanning a predetermined range of control channels in order to determine the first and second strongest control channels. A determination is then made as to whether a first system identification code (SID) associated with a signal received over the strongest control channel is acceptable. This can be accomplished, for example, by comparing the first SID to a list of acceptable SIDs. Conventionally, if the SID associated with the signal received over the strongest control channel is not acceptable, the system acquisition process will be aborted. However, in the present invention, the probability of acquiring service is increased because a determination is made of whether a SID associated with the signal received over the second strongest control channel is acceptable, if the first SID was found not to be acceptable.

Conventionally, the SID associated with the signal received over the second strongest control channel is only determined if the signal received over the strongest control channel cannot be successfully demodulated. For example, this can occur if the signal received over the strongest control channel is a signal made up of noise rather than a control signal. In contrast, in the method of the present invention, the SID of the second strongest channel is considered even if the signal received over the strongest channel was successfully demodulated (associated with an unacceptable SID). This inventive method significantly increases the probability that a user terminal will acquire service in an area where the strongest control signal received by a user terminal is associated with an unacceptable SID (in other words, associated with an unacceptable carrier).

The method of the present invention further comprises the steps of saving the first SID, if the first SID is acceptable. If the first SID is found not to be acceptable, the second SID is saved if the second SID is found to be acceptable.

Paging channels are then scanned and the strongest and second strongest paging channels are determined. Conventionally, if the signal received over the strongest paging channel is actually a paging signal, system acquisition will be aborted if the SID associated with the strongest paging channel is not equal to the saved SID. The present invention increases the probability that the user terminal (UT) will acquire service by determining whether the SID associated with the second strongest paging channel is equal to the saved SID, if the SID associated with the strongest channel was not equal to the saved SID.

Conventionally, the SID associated with the signal received over the second strongest paging channel is only determined if the signal received over the strongest paging channel was not actually a paging signal. For example, this can occur if the signal received over the strongest paging channel is a signal made up of noise rather than a paging signal. In contrast, in the method of the present invention, the SID of the second strongest paging channel is considered even if the signal received over the strongest paging channel was actually a paging signal (e.g., the strongest paging channel was associated with a SID which was not equal to the saved SID).

The probability of acquiring service can be even further increased by having the UT look beyond the second strongest channels (control and/or paging). This and other features of the present invention are disclosed in more detail below.

BRIEF DESCRIPTION OF THE DRAWINGS

The features, objects, and advantages of the present invention will become more apparent from the detailed description set forth below when taken in conjunction with the drawings in which like reference characters identify the same or similar elements throughout and wherein.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention.

Example Environment

Before describing the invention in great detail, it is useful to describe an example environment in which the invention can be implemented. The present invention can be implemented in any analog wireless communication system, especially one in which it is desirable to increase the probability of providing a user with service. Such environments include, without limitation, cellular telephone systems for mobile or portable telephone service.

Figure 1:
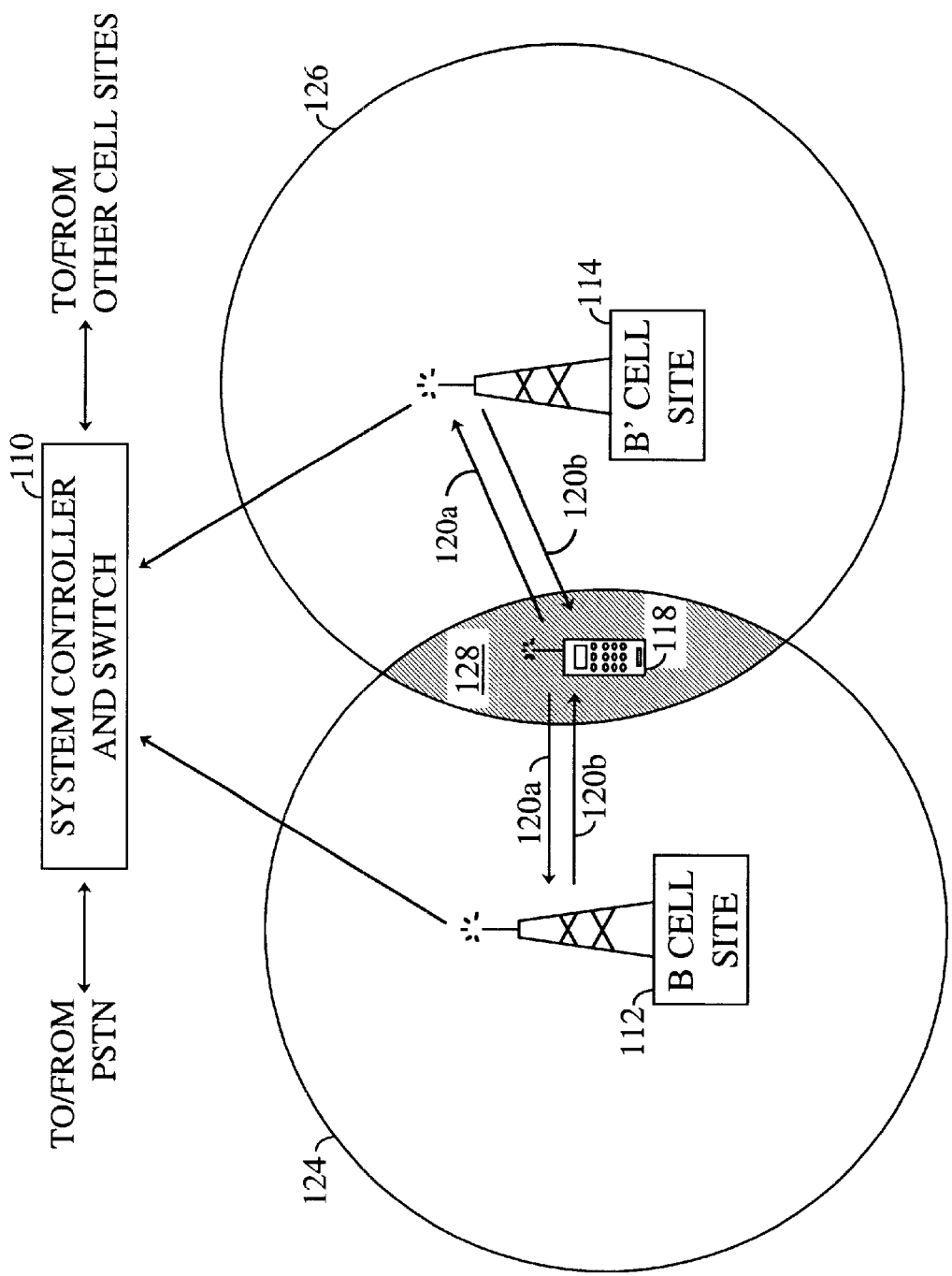
FIG. 1 illustrates a typical communications system in which the present invention is useful.

An example environment in which the present invention is useful is shown in FIG. 1. A system controller and switch 110, also referred to as a mobile telephone switching office (MTSO), typically includes interface and processing circuitry for providing system control to cell sites. Controller 110 also controls the routing of telephone calls from the public switched telephone network (PSTN) to the appropriate cell site for transmission to the appropriate user terminal (sometimes also referred to as a subscriber unit, mobile station, mobile unit, or simply as "a user" or "a subscriber" in some communication systems, depending on preference). Controller 110 also controls the routing of calls from the user terminals, via at least one cell site to the PSTN. Controller 110 can direct calls between user terminals via the appropriate cell site(s) since user terminals do not typically communicate directly with one another. Controller 110 can communicate with the cell sites by various means such as dedicated telephone line, optical fiber links or by microwave communications links. In FIG. 1, two such exemplary cell sites, cell site 112 and cell site 114, along with an exemplary user terminal 118, are illustrated. User terminal (UT) 118 can communicate through radio waves with both cell site 112 and cell site 114. Arrows 120a, 120b show possible communications links between cell site 112 and UT 118. Arrows 122a, 122b show possible communications links between cell site 114 and UT 118.

Cell site 112 (referred to hereafter as B carrier cell site 112) is part of a B carrier's communications system and provides service to a cell coverage area 124, which is part of the B carrier's service area. Cell site 114 (referred to hereafter as B' carrier cell site 114) is part of a B' carrier's communications system and provides service to a cell coverage area 126, which is part of the B' carrier's service area. As discussed above, even though the B carrier and the B' carrier each have a different SID, these two carriers provide service using the same set of frequencies. This may cause UT 118 to experience problems acquiring service when it is located in a "border area" 128 (represented by cross hatched lines) between cell coverage area 124 and cell coverage area 126, as shown in FIG. 1. As discussed below, these problems may occur when a UT attempts to acquire service following the Telecommunications Industry Association (TIA)/ Electronics Industry Association (EIA)/IS-95 standards. The present invention works within the bounds of the TIA/EIA/ IS-95 standard, which is incorporated herein by reference, to improve the probability that a UT can acquire service when the UT is located in a "border area".

Prior to describing the present invention, a description of the conventional method used by a UT to acquire service is provided below, with reference to FIGS. 2 and 3. This conventional method is described in further detail in the publically available TIA/EIA/IS-95 standard, which has been incorporated by reference. Starting with step 204, the UT determines which carrier system(s) it may use based on which user preference(s) has been selected (or programmed into the UT). More specifically, when a UT is powered up (turned "on"), one of the first things the UT does is determine which cellular carrier the UT can use. This may include selecting a cellular carrier in accordance with a custom system selection process. The precise process for custom system selection is beyond the scope of the present invention. However, for exemplary purposes we shall assume that the UT is programmed to handle the following user preferences:

a. Home SID Only
b. Home SID Preferred
c. Specific SID(s) to acquire only
d. Specific SID(s) not to acquire For example, if "Home SID Only" has been selected (or programmed into the UT), the UT knows that it should only use the home carrier for service (for example, carrier B). Based on this determination, the UT sets a serving-system status to indicate which SID(s) it can acquire and/or which SID(s) it can not acquire. For the following description, unless otherwise specified, it is assumed that the serving-system status of the UT is set to "Home SID Only", and that the B carrier corresponds to the Home SID.

After the UT determines which carrier system it can use (for this example, the B carrier), the UT performs the Scan Dedicated Control Channels process as specified in the TIA/EIA/IS-95 standard. To begin this process the UT scans a range of frequencies (associated with the dedicated control channels of the B carrier) in step 206, and identifies the two strongest channels, referred to hereafter as the strongest and second strongest control channels, in step 208. As understood by a person skilled in the relevant art, the specific frequencies scanned depends on which user preference(s) was selected (or programmed into the UT), and which frequencies are associated with the acceptable carrier systems. For example, if the serving-system status of the UT is set to "Home SID Only", and the B carrier corresponds to the Home SID, the UT scans the frequencies associated with the dedicated control channels of the B carrier. For another example, if the UT were programmed such that it can be serviced by any one of a number of various acceptable carriers (that is, if "Specific SIDs to acquire only" was selected), the UT would scan a range of frequencies associated with the dedicated control channels of the plurality of acceptable carriers. After scanning the dedicated control channels, the UT determines which channels are the strongest and second strongest control channels based on a measurement of raw power received over each channel. The UT then acquires (tunes to) the strongest control channel, in step 210, and attempts to demodulate the signal received over the strongest control channel in step 212 (in order to, among other things, determine the SID of the strongest channel).

As shown in steps 214 and 216, if the UT is unable to demodulate the signal received over the strongest control channel, within a specified amount of time (for example, a predetermined amount of time, such as 3 seconds), the UT tunes to the second strongest control channel. The UT may not be able to demodulate the signal received over the strongest control channel for various reasons. For example, the signal received over the strongest control channel may be a signal made up of noise rather than a control signal.

After tuning to the second strongest control channel, the UT attempts to demodulate the signal received over the second strongest control channel, in step 218. As shown in steps 220 and 222, if the UT is unable to demodulate the signal received over the second strongest control channel, within a specified amount of time (for example, a predetermined amount of time, such as 3 seconds), the UT aborts the current acquisition attempt. After aborting the current acquisition attempt the UT may attempt to select another system (for example, an A carrier analog system, a code division multiple access (CDMA) system, or a time division multiple access (TDMA) system) in accordance with programmed redirection criteria. The precise process for determining how to select another system is beyond the scope of the present invention. Alternatively, the UT may return to step 206 if so programmed. For example, where the UT is programmed for "Home SID Only", the UT may be programmed to return to step 206 after aborting a current acquisition attempt.

If the UT successfully demodulated the signal received over the second strongest channel, in step 218, then the UT determines the SID associated with the demodulated signal in step 222. If the SID associated with the demodulated signal is found to be acceptable in step 228 (for example, the SID is determined to be from the list of acceptable SIDs), then the SID is saved in step 230 and the Scan Paging Channels process is entered as specified in the TIA/EIA/IS-95 standard. For example, where the UT is programmed for "Home SID Only," the UT would only enter the Scan Paging Channels process if the SID associated with the demodulated signal is the same as the Home SID. The Scan Paging Channels process, which is shown as step 232, is discussed with reference to FIG. 3.

Returning to step 214, if the UT is able to demodulate the signal received over the strongest control channel, then the UT determines the SID associated with that signal, in step 234. In step 236, the UT determines whether the SID associated with the signal received over the strongest channel is an acceptable SID. If the SID associated with the signal received over the strongest channel is an acceptable SID (for example, is from the list of acceptable SIDs), then the SID is saved in step 230 and the Scan Paging Channels process is entered in step 232, which is discussed in FIG. 3. If the SID associated with the signal received over the strongest channel is not an acceptable SID, then the UT aborts the current acquisition attempt in step 224. As discussed above, after aborting a current system acquisition attempt the UT may attempt to select another system (for example, an A carrier analog system, a CDMA system, or a TDMA system) in accordance with programmed redirection criteria. Alternatively, the UT may return to step 206 if so programmed.

After the SID is saved in step 230, the Scan Paging Channels process begins with the UT scanning the paging channels associated with the acceptable carriers, in step 306. For example, where the serving-system status of the UT is set to "Home SID Only", and the B carrier corresponds to the Home SID, the UT scans the frequencies associated with the paging channels of the B carrier. The paging channels may have distinct frequencies from the dedicated control channels which were scanned in step 206. However, it is noted that many carriers use the same frequencies for dedicated control channels and paging channels. Thus, the frequencies scanned in step 306 may be the same frequencies that were scanned in step 206.

Figure 3:
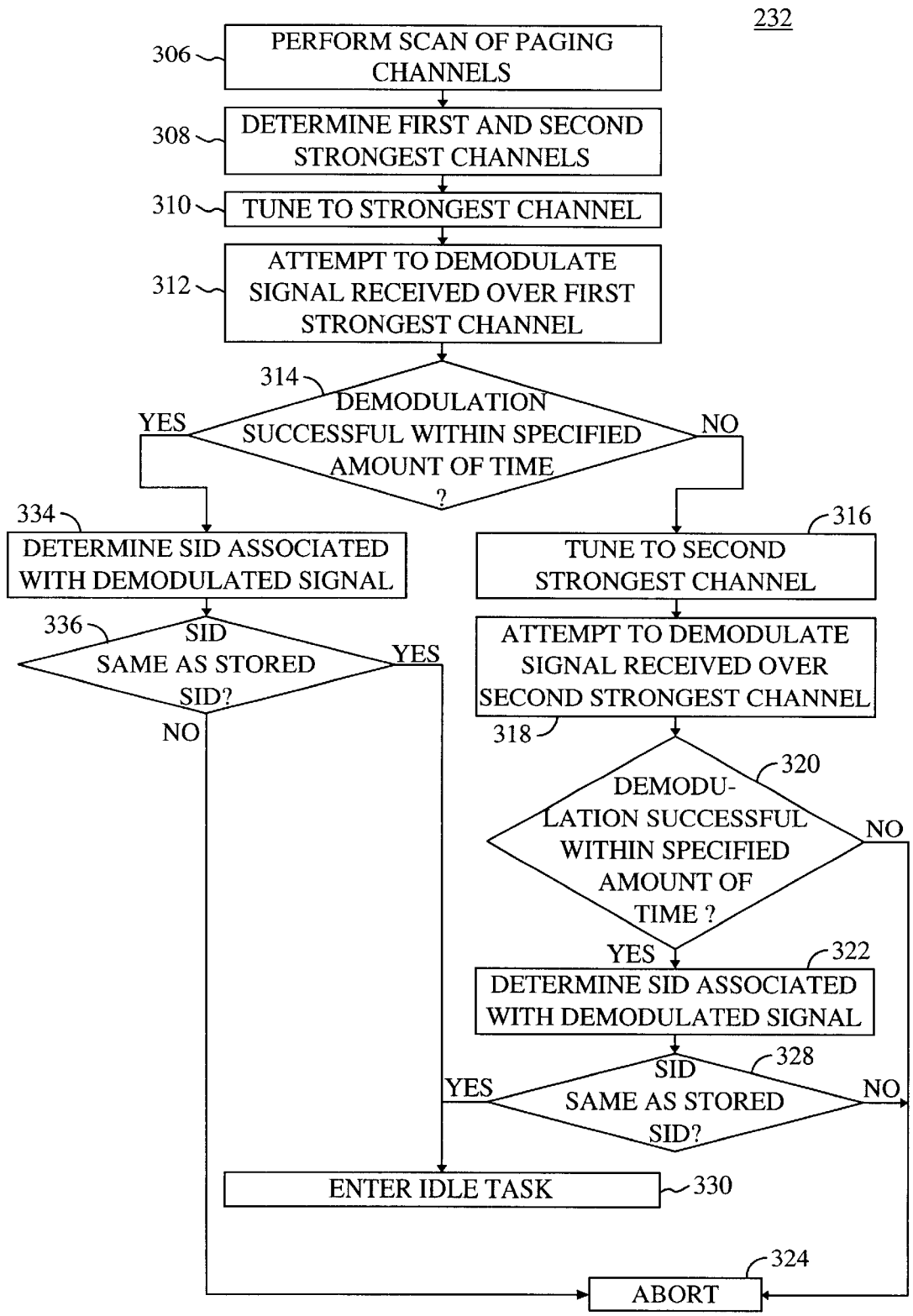
FIG. 3 is a flowchart depicting a conventional method for scanning and acquiring paging channels during a system acquisition process performed by a user terminal.

Referring to FIG. 3, after scanning the paging channels, the UT determines which channels are the strongest and second strongest paging channels based on a measurement of raw power received over each channel, in step 308. The UT then acquires (tunes to) the strongest dedicated control channel, in step 310, and attempts to demodulate the signal received over the strongest channel in step 312 (in order to determine the SID of the strongest channel).

As shown in steps 314 and 316, if the UT is unable to demodulate the signal received over the strongest paging channel, within a specified amount of time (for example, a predetermined amount of time, such as 3 seconds), the UT tunes to the second strongest paging channel. The UT may not be able to demodulate the signal received over the strongest paging channel for various reasons. For example, the signal received over the strongest paging channel may be a signal made up of noise rather than a paging signal.

After tuning to the second strongest paging channel, the UT attempts to demodulate the signal received over the second strongest paging channel, in step 318. As shown in steps 320 and 322, if the UT is unable to demodulate the signal received over the second strongest paging channel, within a specified amount of time (for example, a predetermined amount of time, such as 3 seconds), the UT aborts the current system acquisition attempt. After aborting a current acquisition attempt the UT may attempt to select another system (for example, an A carrier analog system, a CDMA system, or a TDMA system) in accordance with programmed redirection criteria. Alternatively, the UT may return to step 206 if so programmed. The precise process for determining how to select another system is beyond the scope of the present invention.

If the UT successfully demodulated the signal received over the second strongest channel, in step 320, then the UT determines the SID associated with the demodulated signal in step 322. In step 328, the UT compares the SID associated with the demodulated signal to the SID stored in step 230. If the SID associated with the demodulated signal is the same as the SID stored in step 230, then the UT enters the idle task state, in step 330, as specified in the TIA/EIA/IS-95 standard.

Returning the step 314, if the UT was able to demodulate the signal received over the strongest paging channel, then the UT determines the SID associated with that signal, in step 334. In step 336, the UT determines whether the SID associated with the signal received over the strongest channel is equal to the SID stored in step 230. If the SID associated with the signal received over the strongest paging channel is equal to the SID saved in step 230, then the idle task is entered in step 330. If the SID associated with the signal received over the strongest channel is not equal to the stored SID, then the UT aborts the current acquisition attempt in step 324. As discussed above, after aborting a current acquisition attempt the UT may attempt to select another system (for example, an A carrier analog system, a CDMA system, or a TDMA system) in accordance with programmed redirection criteria, or the UT may return to step 206 if so programmed.

Once the UT enters the idle task in step 330 the UT monitors the appropriate channels to await a phone call (or a page). Additionally, once in the idle task state the UT can initiate a call. It is noted that what occurs once the UT enters the idle task state is beyond the scope of the present invention. What is important is that the UT must enter the idle task state in order to acquire service. Thus, an object of the present invention is to increase the probability that the UT will enter the idle task state.

Described below are examples of situations where a UT located in a "border area" will abort acquisition when attempting to acquire service according to the above described acquisition process. These types of situations will occur quite often if a subscriber's residence or office is located in a "border area." Also described below is how the present invention increases the probability that the UT will acquire service. This is accomplished by allowing the UT to look at the SID of the second strongest channel, even if the signals received over the strongest control or paging channel were successfully demodulated.

In a first example, UT 118 located in "border area" 128 tunes to the strongest channel, successfully demodulates the signal received over the strongest channel, and then determines that the SID associated with that signal is not an acceptable SID. If this were to occur when using the conventional acquisition process described above, the UT would abort system acquisition. In the present invention, the probability that the UT acquires service is increased by having the UT tune to the second strongest control channel to see if the SID associated with the second strongest control channel is acceptable. If the SID associated with the second strongest channel is acceptable, the UT saves that SID and proceeds to the Scan Paging Channels process.

In a second example, UT 118 located in "border area" 128 successfully saves a SID during the Scan Dedicated Control channels process, proceeds to the Scan Paging Channel process, tunes to the strongest channel, successfully demodulates the signal received over the strongest channel, and then determines that the SID associated with that signal is not equal to the SID saved during the Scan Dedicated Control channels process. If this were to occur when using the conventional acquisition process described above, the UT would abort system acquisition. In the present invention, the probability that the UT acquires service is increased by having the UT tune to the second strongest paging channel to see if the SID associated with the second strongest paging channel is equal to the saved SID.

Figure 4:
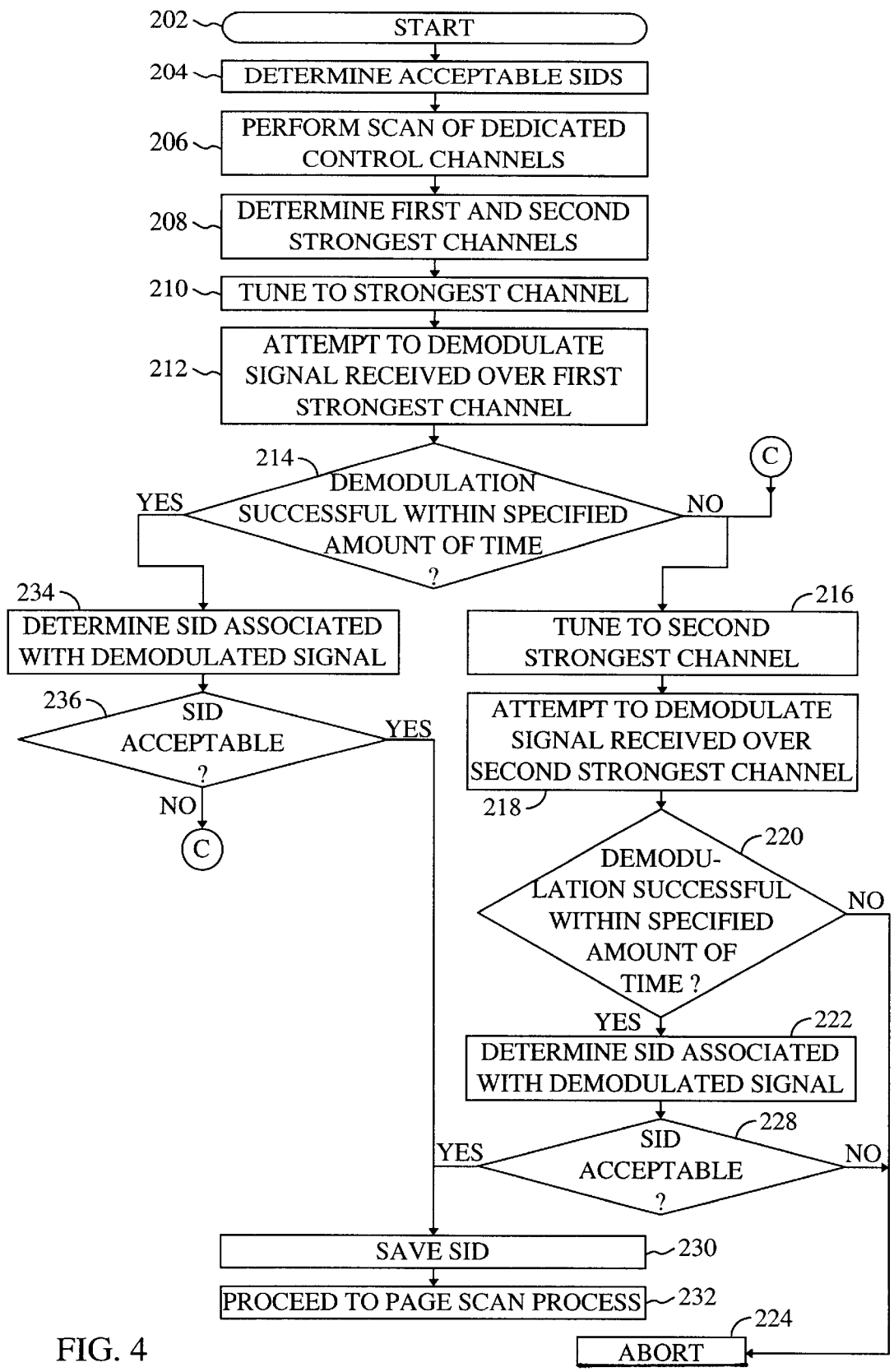
FIG. 4 is a flowchart depicting an improved method for scanning and acquiring control channels during a system acquisition process performed by a user terminal, according to an embodiment of the present invention.
Figure 5:
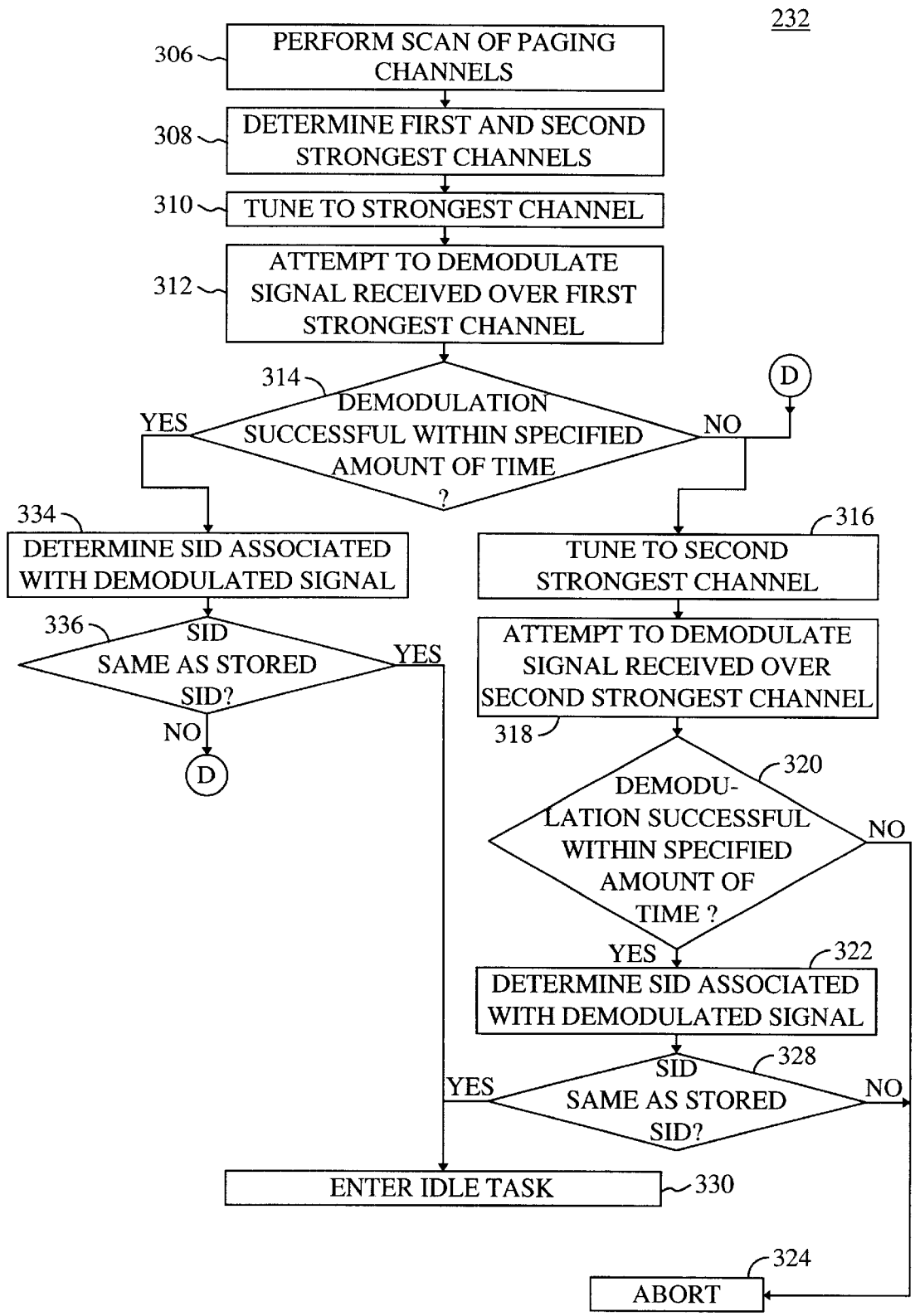
FIG. 5 is a flowchart depicting an improved method for scanning and acquiring paging channels during a system acquisition process performed by a user terminal, according to an embodiment of the present invention.

Additional details of the present invention are described with reference to FIGS. 4 and 5. FIG. 4 is used to describe an improved method for scanning and acquiring dedicated control channels according to an embodiment of the present invention. FIG. 5 is used to describe an improved method for scanning and acquiring paging channels according to an embodiment of the present invention.

Figure 2:
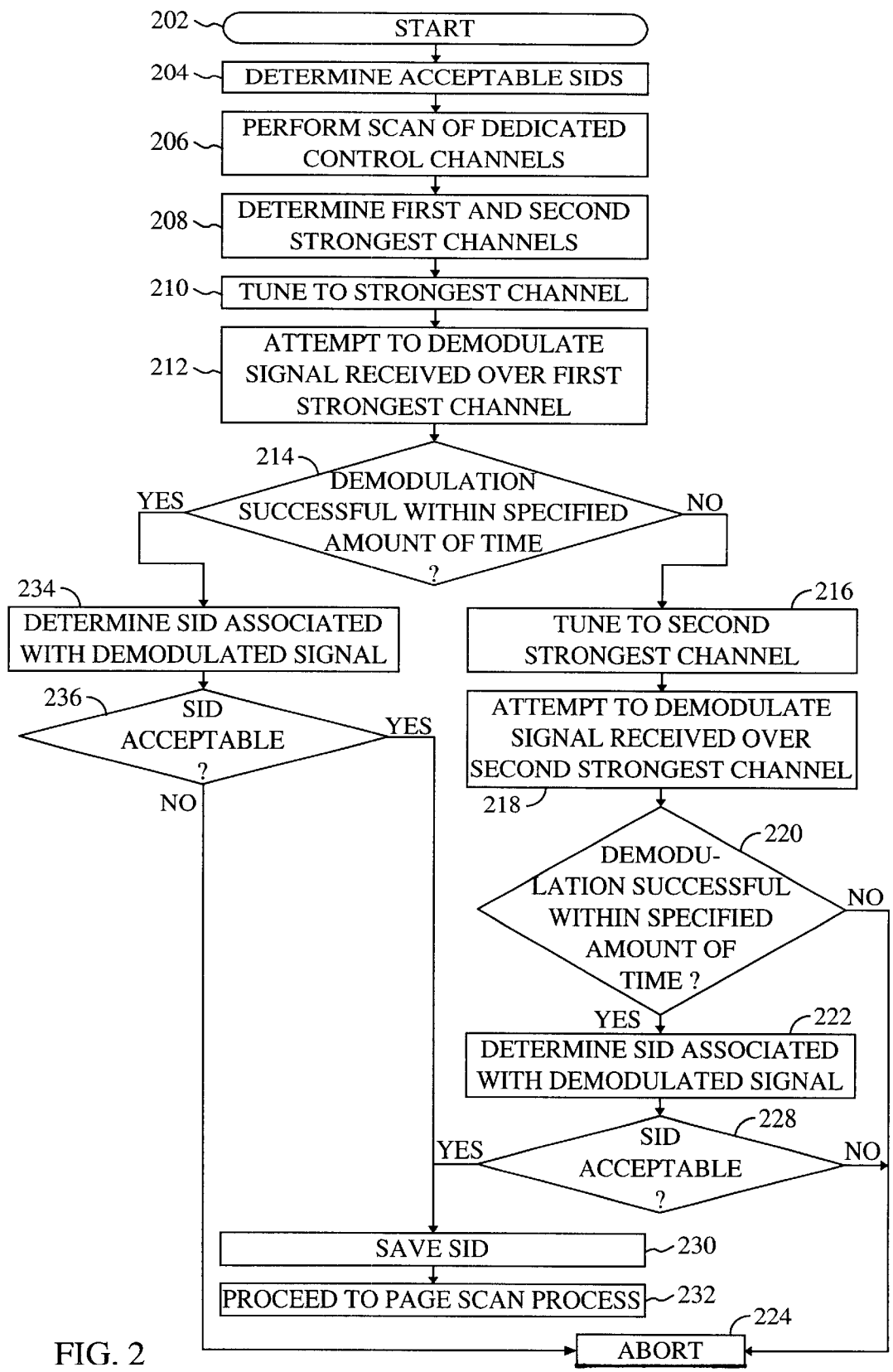
FIG. 2 is a flowchart depicting a conventional method for scanning and acquiring control channels during a system acquisition process performed by a user terminal.

The flow chart of FIG. 4 is very similar to the flow chart of FIG. 2. The main difference between the two flow charts is that if the SID (of a successfully demodulated signal) is not found to be acceptable in step 236 (that is, the answer to step 236 is "NO"), the UT will proceed to step 216 and tune to the second strongest control channel, rather than aborting acquisition in step 224. The flow chart of FIG. 5 is very similar to the flow chart of FIG. 3. The main difference between the two flow charts is that if the SID in step 336 is not found to be the same as the stored SID (that is, the answer to step 336 is "NO"), the UT will proceed to step 316 and tune to the second strongest paging channel, rather than aborting acquisition in step 324.

This invention assists in overcoming major acquisition problems that effect subscribers that spend a significant amount of time in a "border area" between two cells. For example, if a subscriber of a B carrier lives at a location within a "border area" where the B' carrier has a stronger signal, or where the strength of the B carrier signal and the B' carrier signal are very close to one another, the present invention dramatically increases the probability that the subscriber can acquire service from the B carrier.

The probability of acquiring service can be even further increased by having the UT look beyond the second strongest channel. For example, step 208 in FIG. 4 can be modified to "DETERMINE THE FIRST, SECOND, AND THIRD STRONGEST CHANNELS." Then, if the SID is not found to be acceptable in step 228, the UT can tune to the third strongest channel, attempt to demodulate the signal received over the third strongest channel, and save the SID associated with the third strongest channel if it is an acceptable SID. There can be checks to make sure that these steps occur within a predetermined amount of time. Additionally, there can be checks to make sure that the signal strength of the signal associated with the acceptable SID is at least at a predetermined power level.

The present invention is thought to be within the bounds of the TIA/EIA/IS-95 standard since any step of the present invention that does not follow the standard exactly is performed at the receiving end (that is, at the user terminal) and thus can not effect system acquisition performed by other user terminals. More generally, the present invention does not increase interference.

Figure 6:
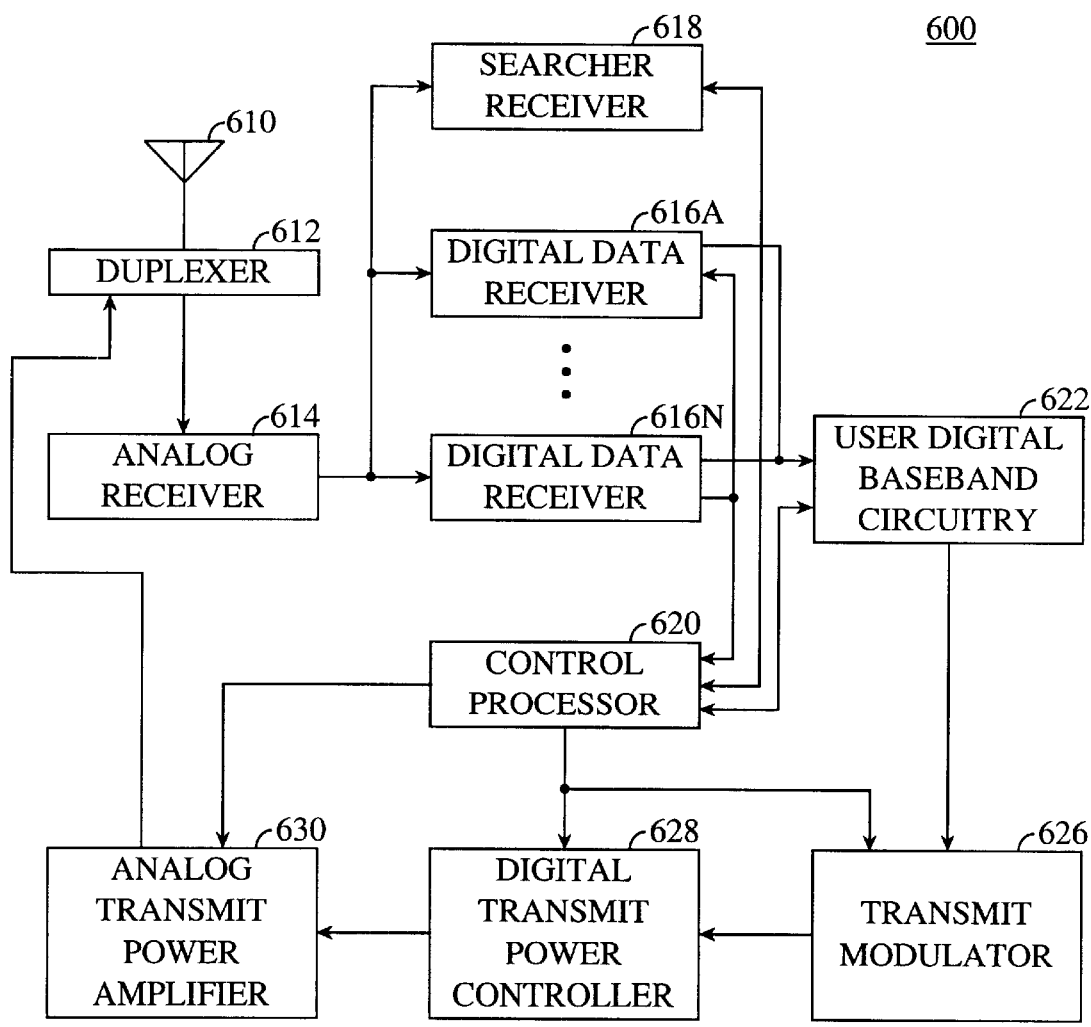
FIG. 6 illustrates an exemplary transceiver for use in a user terminal.

Further, the present invention increases the probability of system acquisition without necessitating any modifications by the system providers (that is, the carriers). More specifically, it is anticipated that all features of the present invention are implemented in the user terminal, not the cell sites or MSTO. An exemplary transceiver 600, for use in user terminal 118, is illustrated in FIG. 6.

Transceiver 600 uses at least one antenna 610 for receiving communication signals, which are transferred to an analog receiver 614, where they are down-converted, amplified, and digitized. A duplexer element 612 is often used to allow the same antenna to serve both transmit and receive functions. However, some systems employ separate antennas for operating at different transmit and receive frequencies.

The digital communication signals output by analog receiver 614 are transferred to at least one digital data receiver 616A and at least one searcher receiver 618. Additional digital data receivers 616B–616N can be used to obtain desired levels of signal diversity, depending on the acceptable level of transceiver complexity, as would be apparent to one skilled in the relevant art.

At least one user terminal control processor 620 is coupled to digital data receivers 616A–616N and searcher receiver 618. Control processor 620 provides, among other functions, basic signal processing, timing, power and handoff control or coordination, and selection of frequency used for signal carriers. Signal processing by control processor 620 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 616A–616N are coupled to digital baseband circuitry 622 within the user terminal. User digital baseband circuitry 622 comprises processing and presentation elements used to transfer information to and from a user terminal. That is, signal or data storage elements, such as transient or long term digital memory; input and output devices such as display screens, speakers, keypad terminals, and handsets; A/D elements, vocoders and other voice and analog signal processing elements; and the like, all form parts of the user digital baseband circuitry 622 using elements well known in the art. If diversity signal processing is employed, user digital baseband circuitry 622 can comprise a diversity combiner. Some of these elements may also operate under the control of, or in communication with, control processor 620. For example, control processor 620 can include a memory that stores a list of all the radio channels (including frequency information) employed by the acceptable carriers.

When voice or other data is prepared as an output message or communications signal originating with the user terminal, user digital baseband circuitry 622 is used to receive, store, process, and otherwise prepare the desired data for transmission. User digital baseband circuitry 622 provides this data to a transmit modulator 626 operating under the control of control processor 620. The output of transmit modulator 626 is transferred to a power controller 628 which provides output power control to a transmit power amplifier 630 for final transmission of the output signal from antenna 610 to a cell site.

Digital receivers 616A–N and searcher receiver 618 are configured to demodulate and track specific signals. Searcher receiver 618 is used to search for pilot signals, dedicated control channels, paging channels, or other relatively fixed pattern strong signals, while digital receivers 616A–N are used to demodulate other signals. Therefore, the outputs of these units can be monitored to determine the energy in, or frequency of, received signals. These receivers also employ frequency tracking elements that can be monitored to provide current frequency and timing information to control processor 620 for signals being demodulated. Control processor 620 uses the demodulated signals to determine, among other things, the SIDs associated with received signals.

It is anticipated that the features of the present invention are performed and/or controlled by control processor 620, which in effect comprises a computer system. Such a computer system includes, for example, one or more processors that are connected to a communication bus. Although telecommunication-specific hardware can be used to implement the present invention, the following description of a general purpose type computer system is provided for completeness.

The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

The computer system can also include a communications interface. The communications interface allows software and data to be transferred between the computer system and external devices. Examples of communications interfaces include, but are not limited to a modem, a network interface (such as an Ethernet card), a communications port, a PCM-CIA slot and card, etc. Software and data transferred via the communications interface are in the form of signals that can be electronic, electromagnetic, optical or other signals capable of being received by the communications interface. These signals are provided to the communications interface via a channel that can be implemented using wire or cable, fiber optics, a phone line, a cellular phone link, an RF link, and the like.

In this document, the terms "computer program medium" and "computer usable medium" are used to generally refer to media such as removable storage device, a removable memory chip (such as an EPROM, or PROM) within UT 118, and signals. Computer program products are means for providing software to the computer system.

Computer programs (also called computer control logic) are stored in the main memory and/or secondary memory. Computer programs can also be received via the communications interface. Such computer programs, when executed, enable the computer system to perform certain features of the present invention as discussed herein. For example features of the flow charts shown in FIGS. 4 and 5 can be implemented in such computer programs. In particular, the computer programs, when executed, enable control processor 620 to perform and/or cause the performance of features of the present invention. Accordingly, such computer programs represent controllers of the computer system of the user terminal. Thus, such computer programs control, for example, which control and paging channels are scanned.

In an embodiment where the invention is implemented using software, the software can be stored in a computer program product and loaded into the computer system using the removable storage drive, the memory chips or the communications interface. The control logic (software), when executed by control processor 620, causes control processor 620 to perform certain functions of the invention as described herein.

In another embodiment, features of the invention are implemented primarily in hardware using, for example, hardware components such as application specific integrated circuits (ASICs). Implementation of the hardware state machine so as to perform the functions described herein will be apparent to persons skilled in the relevant art(s).

In yet another embodiment, features of the invention can be implemented using a combination of both hardware and software.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method of acquiring service in a boarder area serviced by different communications systems assigned a common set of frequencies, comprising:
   a) scanning a predetermined range of frequencies to identify a strongest channel and a second strongest channel;
   b) determining whether a first system identification code (SID) associated with a signal received over the strongest channel is acceptable;
   c) determining whether a second ISD associated with a further signal received over the second strongest channel is acceptable when the first SID is not acceptable;
   d) saving the first SID when the first SID is acceptable;
   e) saving the second SID when the first SID is not acceptable and the second SID is acceptable;
   f) further scanning a second predetermined range of frequencies;
   g) determining based on the further scanning, a strongest channel and a second strongest channel of the second predetermined range of frequencies;
   h) determining whether a SID associated with a signal received over the strongest channel of the second predetermined range of frequencies is equal to the first SID, when the first SID is saved;
   i) determining whether the SID associated with the signal received over the strongest channel of the second predetermined range of frequencies is equal to the second SID, when the second SID is saved;
   j) when the SID associated with the signal received over the strongest channel is not equal to either of the first or second saved SIDS,
      1) determining whether a SID associated with a signal received over the second strongest channel of the second predetermined range of frequencies is equal to the first SID, when the first SID is saved, and
      2) determining whether the SID associated with the signal received over the second strongest channel of the second predetermined range of frequencies is equal to the second SID, when the second SID is saved;
   wherein the first and second predetermined range of frequencies are the same.

2. A wireless communication device for acquiring service in a boarder area serviced by different communications systems assigned a common set of frequencies, comprising:
   a) means for scanning a predetermined range of frequencies to identify a strongest channel and a second strongest channel;
   b) means for determining whether a first system identification code (SID) associated with a signal received over the strongest channel is acceptable;
   c) means for determining whether a second ISD associated with a further signal received over the second strongest channel is acceptable when the first SID is not acceptable;
   d) means for saving the first SID when the first SID is acceptable;
   e) means for saving the second SID when the first SID is not acceptable and the second SID is acceptable;
   f) means for further scanning a second predetermined range of frequencies;
   g) means for determining based on the further scanning, a strongest channel and a second strongest channel of the second predetermined range of frequencies;
   h) means for determining whether a SID associated with a signal received over the strongest channel of the second predetermined range of frequencies is equal to the first SID, when the first SID is saved;
   i) means for determining whether the SID associated with the signal received over the strongest channel of the second predetermined range of frequencies is equal to the second SID, when the second SID is saved; and
   j) means for determining whether a SID associated with a signal received over the second strongest channel of the second predetermined range of frequencies is equal to the first SID, when the first SID is saved and the SID associated with the signal received over the strongest channel is not equal to the first SID, and
      2) means for determining whether the SID associated with the signal received over the second strongest channel of the second predetermined range of frequencies is equal to the second SID, when the second SID is saved and the SID associated with the signal received over the strongest channel is not equal to the first SID;
   wherein the first and second predetermined range of frequencies are the same.

* * * * *